United States Patent [19]

Sano et al.

[11] Patent Number: 4,820,670
[45] Date of Patent: Apr. 11, 1989

[54] DIELECTRIC CERAMIC COMPOSITION

[75] Inventors: Harunobu Sano; Hiroaki Ichikawa; Goro Nishioka; Yukio Sakabe, all of Nagaokakyo, Japan

[73] Assignee: Murata Manufacturing Co., Ltd., Japan

[21] Appl. No.: 125,483

[22] Filed: Nov. 25, 1987

[30] Foreign Application Priority Data

Nov. 26, 1986 [JP] Japan ............................. 61-282772
Dec. 16, 1986 [JP] Japan ............................. 61-300251
Dec. 16, 1986 [JP] Japan ............................. 61-300252

[51] Int. Cl.$^4$ ............................................. C04B 35/46
[52] U.S. Cl. .................................................. 501/136
[58] Field of Search ........................................ 501/136

[56] References Cited

U.S. PATENT DOCUMENTS 4,485,181  11/1984  Sakabe ................................. 501/136
4,552,853  11/1985  Kawabata et al. .................. 501/136
4,601,989   7/1986  Sakabe et al. ...................... 501/136

Primary Examiner—Mark L. Bell
Attorney, Agent, or Firm—Ostrolenk, Faber, Gerb & Soffen

[57] ABSTRACT

A dielectric ceramic composition consists essentially of a main component of a $SrTiO_3$—$PbTiO_3$—$Bi_2O_3$—$TiO_2$—$CaTiO_3$ system and secondary components of manganese oxides, at least one oxide of rare earth elements selected from the group consisting of Nd, La, Ce, Pr and Sm, and one of complex perovskite compounds expressed by the following general formula:

$$A(Cu_{\frac{1}{2}}W_{\frac{1}{2}})O_3$$

(where A is at least one element selected from the group consisting of Pb, Sr and Ca), $$A(Cu_{\frac{1}{3}}Ta_{\frac{2}{3}})O_3$$

wherein A is at least one element selected from the group consisting of Pb, Sr and Ca), and $$A(Cu_{\frac{1}{3}}Nb_{\frac{2}{3}})O_3$$

(where A is at least one element selected from the group consisting of Pb, Sr and Ca). The main component consists essentially, by weight, of 19.5 to 42.8% of $SrTiO_3$, 8.0 to 37.6% of $PbTiO_3$, 4.2 to 33.9% of $CaTiO_3$, 4.4 to 26.9% of $Bi_2O_3$, 4.2 to 13.6% of $TiO_2$ and 0.5 to 12% of $SnO_2$. The contents of the secondary components per 100 parts by weight of the main component are 0.02 to 0.50 parts by weight for manganese oxide in terms of $MnO_2$, 0.1 to 5.0 parts by weight for oxides of rare earth elements in terms of $Re_2O_3$, and 0.1 to 5.0 parts by weight for the complex perovskite compound.

4 Claims, No Drawings

DIELECTRIC CERAMIC COMPOSITION

BACKGROUND OF THE INVENTION

1. Field of the Invention

This invention relates to a dielectric ceramic composition and, more particularly, to a high permittivity dielectric ceramic composition.

2. Description of the Prior Art

So far, dielectric ceramic compositions of a barium titanate system have widely been put into practical use as ceramics of a high permittivity dielectric. However, when these $BaTiO_3$ dielectric ceramics are applied to capacitors, the dielectric loss increases with increasing frequencies and the capacitance is considerably affected by a direct current bias electric field. For example, when a high DC voltage of 5 KV/mm is applied to the capacitor, the capacitance thereof is reduced by 30 to 50%.

On the other hand, many investigations of $SrTiO_3$ systems have been reported in various literatures such as, for example, in "DIELECTRIC PROPERTIES AND STRUCTURE OF $PbTiO_3$—$SrTiO_3$—$Bi_{2/3}TiO_3$ SOLID SOLUTIONS" in ENGLISH TRANSLATION of the BULLETIN of the ACADEMY of SCIENCES OF THE USSR, PHYSICAL SERIES, Vol. 24. No. 11, p1383-1386, by V. Ya. Fritsberg, E. Zh. Freidenfel'd & Ya. Ya. Kruchan, Japanese patent publication No. 41880/1977, and Japanese patent publication No. 31280/1978. The first and second references disclose a dielectric ceramic composition of a $PbTiO_3$—$SrTiO_3$—$Bi_2O_3$—$TiO_2$ system and the third reference discloses a dielectric ceramic composition of a $SrTiO_3$—$PbTiO_3$—$Bi_2O_3$—$TiO_2$—$CaTiO_3$ system.

The ceramics of these systems possess a high dielectric constant of not less than 500 and is low in a change of capacitance with bias electric field as compared with those of the $BaTiO_3$ system, so that they have been put into practical use.

However, these dielectric ceramics also have various problems awaiting a solution in their characteristics and in industrial mass production. For example, a temperature change rate of dielectric constant is large. In addition, since the ceramic compositions of these systems must be fired at a high temperature ranging from 1220° to 1320° C. to obtain optimum dielectric characteristics, it is difficult to avoid evaporation of easily evaporable PbO and $Bi_2O_3$ during sintering without closely controlling the sintering atmosphere of PbO and $Bi_2O_3$.

SUMMARY OF THE INVENTION

It is therefore an object of the present invention to provide a dielectric ceramic composition which overcomes the aforesaid disadvantages.

Another object of the present invention is to provide a dielectric ceramic composition having a high dielectric constant of not less than 500, low DC voltage dependency of the dielectric constant, and small change of dielectric constant with temperature and low dielectric loss even at high frequencies.

Further object of the present invention is to provide a dielectric ceramic composition which can be sintered at a low temperature of not more than 1200° C. without causing variations in stable and uniform dielectric characteristics.

According to the present invention these and other objects are achieved by providing a dielectric ceramic composition consisting essentially of a main component of a $SrTiO_3$—$PbTiO_3$—$Bi_2O_3$—$TiO_2$—$CaTiO_3$ system and secondary components of manganese oxides, at least one oxide of rare earth elements selected from the group consisting of Nd, La, Ce, Pr and Sm, and one of complex perovskite compounds expressed by the following general formula:

$$A(Cu_{\frac{1}{2}}W_{\frac{1}{2}})O_3 \quad (1)$$

(where A is at least one element selected from the group consisting of Pb, Sr and Ca), $$A(Cu_{\frac{1}{2}}Ta_{\frac{2}{3}})O_3 \quad (2)$$

(where A is at least one element selected from the group consisting of Pb, Sr and Ca), and $$A(Cu_{\frac{1}{2}}Nb_{\frac{2}{3}})O_3 \quad (3)$$

(where A is at least one element selected from the group consisting of Pb, Sr and Ca), said main component consisting essentially, by weight, of 19.5 to 42.8% of $SrTiO_3$, 8.0 to 37.6% of $PbTiO_3$, 4.2 to 33.9% of $CaTiO_3$, 4.4 to 26.9% of $Bi_2O_3$, 4.2 to 13.6% of $TiO_2$ and 0.5 to 12% of $SnO_2$, the contents of said secondary components per 100 parts by weight of said main component being 0.02 to 0.50 parts by weight for manganese oxide in terms of $MnO_2$, 0.1 to 5.0 parts by weight for oxides of rare earth elements in terms of $Re_2O_3$, and 0.1 to 5.0 parts by weight for said complex perovskite compound.

DETAILED DESCRIPTION OF THE INVENTION

According to the present invention, there is provided a dielectric ceramic composition consisting essentially of (a) a main component consisting essentially by weight, of 19.5 to 42.8% of $SrTiO_3$, 8.0 to 37.6% of $PbTiO_3$, 4.2 to 33.9% of $CaTiO_3$, 4.4 to 26.9% of $Bi_2O_3$, 4.2 to 13.6% of $TiO_2$ and 0.5 to 12% of $SnO_2$, and (b) secondary components composed of manganese oxides, at least one oxide of rare earth elements selected from the group consisting of Nd, La, Ce, Pr and Sm, and a complex perovskite compound expressed by the general formula: $A(Cu_{\frac{1}{2}}W_{\frac{1}{2}})O_3$ (where A is at least one element selected from the group consisting of Pb, Sr and Ca), the content of the secondary components per 100 parts by weight of said main component being 0.02 to 0.50 parts by weight for manganese oxide in terms of $MnO_2$, 0.1 to 5.0 parts by weight for oxides of rare earth elements in terms of $Re_2O_3$, and 0.1 to 5.0 parts by weight for said complex perovskite compound.

There is also provided a dielectric ceramic composition consisting essentially of (a) a main component consisting essentially, by weight, of 19.5 to 42.8% of $SrTiO_3$, 8.0 to 37.6% of $PbTiO_3$, 4.2 to 33.9% of $CaTiO_3$, 4.4 to 26.9% of $Bi_2O_3$, 4.2 to 13.6% of $TiO_2$ and 0.5 to 12% of $SnO_2$, and (b) secondary components composed of manganese oxides, at least one oxide of rare earth elements selected from the group consisting of Nd, La, Ce, Pr and Sm, and at least one complex perovskite compound expressed by the general formula: $A(Cu_{\frac{1}{2}}Ta_{\frac{2}{3}})O_3$ (where A is at least one element selected from the group consisting of Pb, Sr and Ca), the content of the secondary components per 100 parts by weight of said main component being 0.02 to 0.50 parts by weight for manganese oxide in terms of $MnO_2$, 0.1 to 5.0 parts by weight for oxides of rare earth elements in terms of $Re_2O_3$, and 0.1 to 5.0 parts by weight for said complex perovskite compound.

According to the present invention, there is further provided a dielectric ceramic composition consisting essentially of (a) a main component consisting essentially, by weight, of 19.5 to 42.8% of $SrTiO_3$, 8.0 to 37.6% of $PbTiO_3$, 4.2 to 33.9% of $CaTiO_3$, 4.4 to 26.9% of $Bi_2O_3$, 4.2 to 13.6% of $TiO_2$ and 0.5 to 12% of $SnO_2$, and (b) secondary components composed of manganese oxides, at least one oxide of rare earth elements selected from the group consisting of Nd, La, Ce, Pr and Sm, and at lest one complex perovskite compound expressed by the general formula: $A(Cu_{\frac{1}{3}}Nb_{\frac{2}{3}})O_3$ (where A is at least one element selected from the group consisting of Pb, Sr and Ca), the content of the secondary components per 100 parts by weight of said main component being 0.02 to 0.50 parts by weight for manganese oxide in terms of $MnO_2$, 0.1 to 5.0 parts by weight for oxides of rare earth elements in terms of $Re_2O_3$, and 0.1 to 5.0 parts by weight for said complex perovskite compound.

The above dielectric ceramic composition may be produced in the conventionally known manner. Raw materials for the dielectric ceramic composition may be used in the form of oxides, carbonates and other compounds which can be converted into oxides of the respective elements during sintering. Also, the raw materials may be used in the form of perovskite type compounds such as $SrTiO_3$, $PbTiO_3$, $CaTiO_3$, $Pb(Cu_{\frac{1}{2}}W_{\frac{1}{2}})O_3$, $Sr(Cu_{\frac{1}{2}}W_{\frac{1}{2}})O_3$, $Ca(Cu_{\frac{1}{2}}W_{\frac{1}{2}})O_3$, $Pb(Cu_{\frac{1}{3}}Ta_{\frac{2}{3}})O_3$, $Sr(Cu_{\frac{1}{3}}Ta_{\frac{2}{3}})O_3$, $Ca(Cu_{\frac{1}{3}}Ta_{\frac{2}{3}})O_3$, $Pb(Cu_{\frac{1}{3}}Nb_{\frac{2}{3}})O_3$, $Sr(Cu_{\frac{1}{3}}Nb_{\frac{2}{3}})O_3$, $Ca(Cu_{\frac{1}{3}}Nb_{\frac{2}{3}})O_3$ and the like.

The contents of the respective components in the main component have been limited to those falling within the above respective ranges for the following reasons: If the content of $SrTiO_3$ is less than 19.5% by weight, the the dielectric loss at 1 MHz exceeds 0.5%. If the content of $SrTiO_3$ exceeds 42.8% by weight, the temperature change rate of dielectric constant becomes large. Thus, the content of $SrTiO_3$ has been limited to those ranging from 19.5 to 42.8% by weight.

If the content of $PbTiO_3$ is less than 8.0% by weight, the dielectric constant becomes small and less than 500. If the content of $PbTiO_3$ exceeds 37.6% by weight, the dielectric loss (tan δ) at 1 MHz exceeds 0.5%, the bias characteristics of the products becomes worse and the temperature change rate of dielectric constant becomes large. For these reasons, the content of $PbTiO_3$ has been limited to those ranging from 8.0 to 37.6% by weight.

If the content of $CaTiO_3$ is less than 4.2% by weight, the dielectric loss (tan δ) at 1 MHz exceeds 0.5% and the bias characteristics of the products becomes worse. If the content of $CaTiO_3$ exceeds 33.9% by weight, the dielectric constant becomes low and less than 500. For these reasons, the content of $CaTiO_3$ has been limited to those ranging from 4.2 to 33.9% by weight.

If the content of $Bi_2O_3$ is less than 4.4% by weight, the temperature change rate of dielectric constant becomes large. If the content of $Bi_2O_3$ exceeds 26.9% by weight, the dielectric loss (tan δ) at 1 MHz becomes 0.5%. Thus, the content of $Bi_2O_3$ has been limited to those ranging from 4.4 to 26.9% by weight.

If the content of $TiO_2$ is less than 4.2% by weight, the sintering temperature becomes higher than 1200° C. If the content of $TiO_2$ exceeds 13.6% by weight, the temperature change rate of dielectric constant becomes large. For these reasons, the content of $TiO_2$ has been limited to those ranging from 4.2 to 13.6% by weight.

If the content of $SnO_2$ is less than 0.5% by weight, the dielectric loss (tan δ) at 1 MHz exceeds 0.5% and the specific resistance of the product at a high temperature becomes low and less than $10^{13}$ Ω-cm. If the content of $SnO_2$ exceeds 12.0% by weight, the dielectric constant becomes less than 500. For these reasons, the content of $SnO_2$ has been limited to those ranging from 0.5 to 12.0% by weight.

The reasons why the contents of the secondary components have been limited to those falling within the above respective ranges are as follows: If the content of $MnO_2$ is less than 0.02 parts by weight per 100 parts by weight of the main component, the specific resistance at high temperatures becomes low and less than $10^{13}$ Ω-cm, and the sintering temperature becomes higher than 1200° C. If the content of $MnO_2$ exceeds 0.5 parts by weight, the dielectric loss (tan δ) at 1 MHz becomes large and more than 0.5%. Thus, the content of manganese oxides has been limited to those ranging of 0.02 to 0.5 parts by weight per 100 parts by weight of the main component in terms of $MnO_2$.

If the content of oxides of rare earth elements (Re) per 100 parts by weight of the main component is less than 0.1 parts by weight in terms of $Re_2O_3$, the dielectric loss (tan δ) at 1 MHz becomes large and more than 0.5%. If the content of $Re_2O_3$ exceeds 5.0 parts by weight, the dielectric constant becomes low and less than 500. Thus, the content of oxides of rare earth elements has been limited to those ranging from 0.1 to 5.0 parts by weight per 100 parts by weight of the main component in terms of $Re_2O_3$.

If the content of the complex compounds of the formula: $A(Cu_{\frac{1}{2}}W_{\frac{1}{2}})O_3$, or $A(Cu_{\frac{1}{3}}Ta_{\frac{2}{3}})O_3$, or $A(Cu_{\frac{1}{3}}Nb_{\frac{2}{3}})O_3$ is less than 0.1 parts by weight per 100 parts by weight of the main component, the dielectric loss (tan δ) at 1 MHz becomes large and more than 0.5 and the sintering temperature becomes higher than 1200° C. If it exceeds 5.0 part by weight, the specific resistance at high temperatures becomes less than $10^{13}$ Ω-cm. Thus, the content of the complex compound has been limited to those ranging from 0.1 to 5.0 parts by weight per 100 parts by weight of the main component.

The dielectric ceramic composition according to the present invention has a dielectric constant of more than 500, low DC voltage dependency of the dielectric constant, high specific resistance at high temperatures, a small temperature change rate of capacitance and low dielectric loss even at high frequencies. Since the composition can be sintered at a low temperature, thus making it possible to mass produce dielectric ceramic products such as capacitors with uniform dielectric characteristics.

The present invention will be further apparent from the following description with reference to examples thereof.

EXAMPLE 1

Using industrial grade, $SrCO_3$, $Pb_3O_4$, $CaCO_3$, $Bi_2O_3$, $TiO_2$, $SnO_2$, $MnO_2$, $CuO$, $WO_3$, $Nd_2O_3$, $La_2O_3$, $CeO_2$, $Pr_2O_3$ and $Sm_2O_3$ as raw materials, there were prepared specimens having a composition shown in Table 1 in the following manner: Firstly, the raw materials $SrCO_3$, $Pb_3O_4$, $CaCO_3$, $Bi_2O_3$, $TiO_2$, $CuO$ and $WO_3$ were weighed and milled in a ball mill to prepare $SrTiO_3$, $PbTiO_3$, $CaTiO_3$, $Pb(Cu_{\frac{1}{2}}W_{\frac{1}{2}})O_3$, $Sr(Cu_{\frac{1}{2}}W_{\frac{1}{2}})O_3$, $Ca(Cu_{\frac{1}{2}}W_{\frac{1}{2}})O_3$. Each of the resultant mixtures for $SrTiO_3$ and $CaTiO_3$, was calcined at 1150° C. for 2 hours, crushed and milled to prepare calcined powders. The mixture for $PbTiO_3$ was calcined at 950° C., while mixtures for $Pb(Cu_{\frac{1}{3}}W_{\frac{1}{3}})O_3$, $Sr(Cu_{\frac{1}{3}}W_{\frac{1}{3}})O_3$ and $Ca(Cu_{\frac{1}{3}}W_{\frac{1}{3}})O_3$ were at 850° C.

The thus prepared, calcined powders were weighed together with powders of secondary additives, $MnO_2$, $Nd_2O_3$, $La_2O_3$, $CeO_2$, $Pr_2O_3$ and $Sm_2O_3$ to prepare a mixture for a dielectric ceramic composition having a composition shown in Table 1, and then ball milled by the wet process for 16 hours together with a suitable amount of binder, using a polyethylene not with alumina balls. Each mixture was dried, granulated and then compacted into disks with a diameter of 10 mm and a thickness of 1.2 mm under a pressure of 2000 Kg/cm². The disks were fired at a temperature ranging from 1070° to 1250° C. to prepare ceramic disks.

A pair of silver electrodes were provided on each resultant ceramic disk by applying silver paste on its opposite sides and then baking it at 800° C.

Test specimen No. 30 was prepared in the following manner: Raw materials, $SrCO_3$, $Pb_3O_4$, $CaCO_3$, $Bi_2O_3$, $TiO_2$ $SnO_2$, $MnO_2$, CuO and $WO_3$ and $Nd_2O_3$ were weighed and milled by the wet process with a ball mill to prepare a mixture for a composition shown in Table 1, calcined at 950° C. for 2 hours, crushed and then ball milled by the wet process together with 3 parts by weight of polyvinyl alcohol binder. The resultant mixture was dried, granulated and then compacted into disks with a diameter of 10 mm and a thickness of 1.2 mm under a pressure of 2000 Kg/cm². The disks were fired at a temperature ranging from 1100° to 1230° C. to prepare ceramic disks. A pair of silver electrodes were provided on each resultant ceramic disk by applying silver paste on its opposite sides and then then baking it at 800° C.

The thus prepared test specimens were subjected to measurements of its dielectric constant ($\epsilon$), dielectric loss (tan $\delta$), specific resistance ($\rho$), bias characteristics ($\Delta C_v$), and a change rate of dielectric constant with temperature ($\Delta C/C_{20}$).

The dielectric constant ($\epsilon$) was measured at a frequency of 1 KHz while the dielectric loss was measured at frequencies of 1 KHz and 1 MHz. The specific resistance was measured 2 minutes later after applying a DC voltage of 500 V/mm at 25° C. and 125° C.

The bias characteristic, i.e., change rate of capacitance with voltage was determined by applying a DC bias voltage of 5 KV/mm. The change rate of capacitance with temperature was determined by values measured at $-25°$ C., $+20°$ C. and $+85°$ C. and given by the equation:

$$\Delta C/C_{20} = \frac{(C_t - C_{20})}{C_{20}}$$

where $C_t$ is the capacitance measured at $-25°$ C. or $+85°$ C., and $C_{20}$ is that at 20° C.

The results are shown in Table 2 together with the optimum sintering temperature (Ts). In Tables 1 and 2, the specimens with an asterisk (*) are those having a composition beyond the scope of the present invention.

TABLE 1

| No. | Main Component (wt %) | | | | | | Secondary Components (parts by weight) | | | | | |
|---|---|---|---|---|---|---|---|---|---|---|---|---|
| | $SrTiO_3$ | $PbTiO_3$ | $CaTiO_3$ | $Bi_2O_3$ | $TiO_2$ | $SnO_2$ | $MnO_2$ | $Re_2O_3$ | | $A(Cu_{\frac{1}{3}}W_{\frac{1}{3}})O_3$ | |
| 1 | 19.5 | 37.6 | 16.9 | 16.3 | 7.9 | 1.8 | 0.15 | Re=Nd | 1.0 | A=Sr | 1.0 |
| 2 | 26.0 | 19.1 | 15.0 | 25.9 | 12.7 | 1.3 | 0.02 | Re=La | 2.0 | A=Pb | 0.1 |
| 3 | 25.7 | 18.9 | 14.8 | 25.7 | 11.2 | 3.7 | 0.50 | Re=Ce | 1.0 | A=Pb | 4.0 |
| 4 | 24.7 | 18.2 | 14.2 | 24.6 | 6.3 | 12.0 | 0.10 | Re=Nd | 2.0 | A=Ca | 2.0 |
| 5 | 33.8 | 16.7 | 31.0 | 12.2 | 5.1 | 1.2 | 0.10 | Re=Nd | 0.5 | A=Pb | 3.0 |
| 6 | 42.8 | 14.2 | 4.2 | 25.6 | 10.1 | 3.1 | 0.10 | Re=Pr | 1.0 | A=Pb | 5.0 |
| 7 | 37.4 | 8.0 | 13.8 | 26.9 | 11.4 | 2.5 | 0.10 | Re=Sm | 1.0 | A=Pb | 2.0 |
| 8 | 25.0 | 33.9 | 21.1 | 4.4 | 7.9 | 7.7 | 0.15 | Re=Nd | 0.1 | A=Ca | 3.0 |
| 9 | 34.1 | 18.8 | 8.4 | 25.5 | 12.6 | 0.6 | 0.10 | Re=Nd | 1.0 | A=Sr | 2.0 |
| 10 | 22.5 | 18.6 | 30.5 | 18.8 | 9.1 | 0.5 | 0.10 | Re=Nd | 5.0 | A=Pb | 3.0 |
| 11 | 29.7 | 14.7 | 15.4 | 26.1 | 13.6 | 0.5 | 0.10 | Re=Ce | 2.0 | A=Pb | 2.0 |
| 12* | 17.9 | 36.1 | 6.0 | 25.3 | 9.2 | 5.5 | 0.10 | Re=Nd | 0.5 | A=Pb | 3.0 |
| 13* | 43.2 | 10.0 | 24.8 | 12.4 | 8.9 | 0.7 | 0.10 | Re=Ce | 2.0 | A=Pb | 1.0 |
| 14* | 36.7 | 6.3 | 18.7 | 25.3 | 12.3 | 0.7 | 0.10 | Re=Nd | 2.0 | A=Ca | 2.0 |
| 15* | 28.5 | 41.9 | 7.0 | 15.9 | 7.4 | 1.5 | 0.15 | Re=Nd | 1.0 | A=Sr | 1.0 |
| 16* | 39.1 | 13.0 | 3.5 | 25.6 | 12.0 | 6.8 | 0.15 | Re=Sm | 2.0 | A=Pb | 2.0 |
| 17* | 24.6 | 18.1 | 14.1 | 24.5 | 5.6 | 13.1 | 0.10 | Re=Nd | 2.0 | A=Pb | 3.0 |
| 18* | 31.5 | 10.6 | 18.9 | 25.8 | 11.0 | 2.2 | 0.10 | | 0 | A=Pb | 2.0 |
| 19* | 26.9 | 22.2 | 36.5 | 9.5 | 4.2 | 0.7 | 0.15 | Re=Nd | 2.0 | A=Pb | 2.0 |
| 20* | 25.3 | 35.6 | 18.2 | 4.2 | 10.3 | 6.4 | 0.10 | Re=Nd | 2.0 | A=Pb | 1.0 |
| 21* | 20.3 | 16.8 | 27.5 | 27.9 | 4.4 | 3.1 | 0.15 | Re=Nd | 1.0 | A=Pb | 2.0 |
| 22* | 28.2 | 12.5 | 18.6 | 26.0 | 3.2 | 11.5 | 0.10 | Re=La | 2.0 | A=Pb | 2.0 |
| 23* | 40.3 | 14.3 | 6.4 | 22.5 | 15.2 | 1.3 | 0.10 | Re=La | 2.0 | A=Pb | 1.0 |
| 24* | 37.4 | 8.0 | 13.8 | 26.9 | 11.4 | 2.5 | 0 | Re=Nd | 1.0 | A=Pb | 2.0 |
| 25* | 23.4 | 33.1 | 17.3 | 16.8 | 7.8 | 1.6 | 0.80 | Re=Nd | 1.0 | A=Pb | 0.5 |
| 26* | 25.0 | 21.1 | 33.9 | 8.9 | 4.1 | 0.5 | 0.10 | Re=Nd | 8.0 | A=Pb | 2.0 |
| 27* | 34.1 | 18.8 | 8.4 | 25.5 | 12.6 | 0.6 | 0.50 | Re=Nd | 1.0 | | 0 |
| 28* | 34.1 | 18.8 | 8.4 | 25.5 | 12.6 | 0.6 | 0.50 | Re=Nd | 1.0 | A=Pb | 8.0 |
| 29* | 31.5 | 10.6 | 18.9 | 25.8 | 13.2 | 0 | 0.10 | Re=Nd | 3.0 | A=Pb | 3.0 |
| 30 | 33.8 | 16.7 | 31.0 | 12.2 | 5.1 | 1.2 | 0.10 | Re=Nd | 0.5 | A=Pb | 3.0 |

TABLE 2

| No. | Ts (°C.) | $\epsilon$ (1 KHz) | tan $\delta$ | | $\Delta C/C$ (%) | | $\rho$ ($\Omega$-cm) | | $\Delta C_v$ (%) |
|---|---|---|---|---|---|---|---|---|---|
| | | | 1 KHz | 1 MHz | $-25°$ C. | $+85°$ C. | at 25° C. | at 85° C. | |
| 1 | 1120 | 1510 | 0.22 | 0.41 | 3.5 | $-6.4$ | $1.2 \times 10^{14}$ | $2.2 \times 10^{13}$ | $+9.5$ |
| 2 | 1140 | 1050 | 0.14 | 0.30 | 2.9 | $-2.0$ | $1.8 \times 10^{14}$ | $3.0 \times 10^{13}$ | $+12.0$ |
| 3 | 1120 | 790 | 0.10 | 0.25 | 4.2 | $-4.8$ | $9.5 \times 10^{13}$ | $6.1 \times 10^{13}$ | $+10.1$ |

TABLE 2-continued

| No. | Ts (°C.) | ε 1 KHz | tan δ 1 KHz | tan δ 1 MHz | ΔC/C (%) −25° C. | ΔC/C (%) +85° C. | ρ (Ω-cm) 25° C. | ρ (Ω-cm) 125° C. | ΔC$_v$ (%) |
|---|---|---|---|---|---|---|---|---|---|
| 4 | 1180 | 510 | 0.11 | 0.22 | 4.1 | −6.5 | $9.0 \times 10^{13}$ | $7.2 \times 10^{13}$ | +6.7 |
| 5 | 1070 | 1450 | 0.12 | 0.19 | 5.5 | −7.0 | $1.1 \times 10^{14}$ | $1.2 \times 10^{13}$ | +7.2 |
| 6 | 1120 | 1050 | 0.13 | 0.29 | 6.2 | −7.2 | $8.7 \times 10^{13}$ | $6.0 \times 10^{13}$ | +1.0 |
| 7 | 1150 | 530 | 0.05 | 0.07 | 6.4 | −7.2 | $1.0 \times 10^{14}$ | $1.1 \times 10^{13}$ | +3.5 |
| 8 | 1120 | 1020 | 0.18 | 0.32 | 4.9 | −6.1 | $1.2 \times 10^{14}$ | $1.2 \times 10^{13}$ | +1.4 |
| 9 | 1110 | 1070 | 0.24 | 0.48 | 3.2 | −5.9 | $9.3 \times 10^{13}$ | $1.1 \times 10^{13}$ | +3.9 |
| 10 | 1100 | 570 | 0.08 | 0.10 | 4.3 | −6.3 | $1.1 \times 10^{14}$ | $1.1 \times 10^{13}$ | +3.5 |
| 11 | 1120 | 680 | 0.20 | 0.30 | 1.9 | −2.5 | $1.2 \times 10^{14}$ | $1.0 \times 10^{13}$ | +4.1 |
| 12* | 1120 | 1250 | 0.36 | 1.80 | 5.0 | −7.0 | $9.7 \times 10^{13}$ | $3.1 \times 10^{13}$ | +0.5 |
| 13* | 1150 | 620 | 0.09 | 0.10 | 11.3 | −13.7 | $1.2 \times 10^{14}$ | $1.3 \times 10^{13}$ | +9.0 |
| 14* | 1090 | 410 | 0.15 | 0.25 | 3.5 | −4.2 | $1.0 \times 10^{14}$ | $3.2 \times 10^{13}$ | +4.1 |
| 15* | 1130 | 2130 | 0.23 | 2.30 | 13.1 | −17.3 | $9.9 \times 10^{13}$ | $1.1 \times 10^{13}$ | −4.0 |
| 16* | 1120 | 1230 | 0.20 | 1.10 | 5.4 | −7.1 | $1.3 \times 10^{14}$ | $2.1 \times 10^{13}$ | −8.2 |
| 17* | 1170 | 400 | 0.30 | 1.30 | 6.9 | −9.0 | $8.5 \times 10^{13}$ | $7.6 \times 10^{13}$ | +0.9 |
| 18* | 1150 | 920 | 0.24 | 1.40 | 1.5 | −2.3 | $1.0 \times 10^{14}$ | $1.3 \times 10^{13}$ | +3.9 |
| 19* | 1120 | 440 | 0.14 | 0.09 | 6.1 | −7.2 | $1.2 \times 10^{14}$ | $3.4 \times 10^{13}$ | +5.1 |
| 20* | 1100 | 1350 | 0.15 | 0.30 | 8.9 | −13.0 | $1.1 \times 10^{14}$ | $2.9 \times 10^{13}$ | +2.1 |
| 21* | 1140 | 540 | 0.35 | 0.70 | 6.5 | −8.3 | $1.2 \times 10^{14}$ | $2.0 \times 10^{13}$ | +3.0 |
| 22* | 1210 | 890 | 0.20 | 0.41 | 2.2 | −5.5 | $1.3 \times 10^{14}$ | $2.3 \times 10^{13}$ | +2.1 |
| 23* | 1130 | 1010 | 0.18 | 0.32 | 4.7 | −11.0 | $1.2 \times 10^{14}$ | $1.2 \times 10^{13}$ | +1.4 |
| 24* | 1250 | 650 | 0.13 | 0.19 | 3.9 | −4.2 | $9.5 \times 10^{13}$ | $9.7 \times 10^{11}$ | +2.5 |
| 25* | 1120 | 1190 | 0.75 | 0.92 | 3.5 | −6.7 | $1.3 \times 10^{14}$ | $1.2 \times 10^{13}$ | +9.7 |
| 26* | 1110 | 470 | 0.03 | 0.08 | 5.5 | −7.1 | $1.2 \times 10^{14}$ | $2.0 \times 10^{13}$ | +3.8 |
| 27* | 1200 | 1190 | 0.75 | 1.90 | 5.0 | −9.5 | $9.5 \times 10^{13}$ | $2.5 \times 10^{13}$ | +4.0 |
| 28* | 1090 | 920 | 0.18 | 0.40 | 2.5 | −3.0 | $8.5 \times 10^{13}$ | $3.7 \times 10^{12}$ | +3.5 |
| 29* | 1160 | 970 | 0.17 | 0.40 | 2.0 | −2.4 | $9.0 \times 10^{13}$ | $9.1 \times 10^{11}$ | +1.0 |
| 30 | 1070 | 1420 | 0.11 | 0.15 | 5.6 | −7.2 | $1.2 \times 10^{14}$ | $1.3 \times 10^{13}$ | +7.5 |

From the data shown in Table 2, it can be seen that the dielectric ceramic composition according to the present invention has a high dielectric constant of more than 500, a low dielectric loss (tan δ) of not more than 0.5% even at 1 MHz, and a high specific resistance of not less than $10^{13}$ Ω-cm. In addition, the dielectric constant is scarcely decreased even if a direct current voltage of 5 KV/mm is applied to the products. Further, the temperature change rate of capacitance is considerably small and −7.2% at the maximum at +85° C. The composition of the present invention has a sintering temperature ranging from 1070 to 1180 which is lower by about 100° to 200° C. as compared with the compositions of the prior art.

EXAMPLE 2

As raw materials, there were used powders of industrial grade $SrCO_3$, $Pb_3O_4$, $CaCO_3$, $Bi_2O_3$, $TiO_2$, $SnO_2$, $MnO_2$, CuO, $Ta_2O_5$, $Nd_2O_3$, $La_2O_3$, $CeO_2$, $Pr_2O_3$ and $Sm_2O_3$. There were prepared mixtures for preparation of $SrTiO_3$, $PbTiO_3$, $CaTiO_3$, $Pb(Cu_{\frac{1}{3}}Ta_{\frac{2}{3}})O_3$, $Sr(Cu_{\frac{1}{3}}Ta_{\frac{2}{3}})O_3$, and $Ca(Cu_{\frac{1}{3}}Ta_{\frac{2}{3}})O_3$, respectively. The resultant mixtures for $SrTiO_3$ and $CaTiO_3$ were calcined at 1150° C. for 2 hours, crushed and milled to prepare calcined powders. The mixture for $PbTiO_3$ was calcined at 950° C., and other mixtures for $Pb(Cu_{\frac{1}{3}}Ta_{\frac{2}{3}})O_3$, $Sr(Cu_{\frac{1}{3}}Ta_{\frac{2}{3}})O_3$, $Ca(Cu_{\frac{1}{3}}Ta_{\frac{2}{3}})O_3$ were at 850° C., respectively.

The thus prepared compound powders were weighed together with powders of $MnO_2$ and oxides of rare earth elements ($Nd_2O_3$, $La_2O_3$, $CeO_2$, $Pr_2O_3$ and $Sm_2O_3$) to prepare a mixture for a dielectric ceramic composition having compositional proportions shown in Table 3, and then ball milled in polyethylene pot with alumina balls by the wet process for 16 hours together with a suitable amount of binder. The mixture was dried, granulated and then compacted into disks with a diameter of 10 mm and a thickness of 1.2 mm under a pressure of 2000 Kg/cm². The disks were fired at a temperature ranging from 1070° to 1250° C. to prepare ceramic disks.

A pair of silver electrodes were provided on opposite surfaces of the resultant ceramic disk by applying silver paste on its opposite sides and then then baking it at 800° C.

Test specimen No. 60 was prepared in the following manner: Raw materials, $SrCO_3$, $Pb_3O_4$, $CaCO_3$, $Bi_2O_3$, $TiO_2$, $SnO_2$, $MnO_2$, CuO and $Ta_2O_5$ and $Nd_2O_3$ were weighed and milled by the wet process with a ball mill to prepare a mixture for a composition shown in Table 3, calcined at 950° C. for 2 hours, crushed and then ball milled by the wet process together with 3 parts by weight of polyvinyl alcohol binder. The resultant mixture was dried, granulated and then compacted into disks with a diameter of 10 mm and a thickness of 1.2 mm under a pressure of 2000 Kg/cm². The disks were fired at a temperature ranging from 1100° to 1230° C. to prepare ceramic disks. A pair of silver electrodes were provided on each resultant ceramic disk by applying silver paste on its opposite sides and then then baking it at 800° C.

The thus prepared test specimens were subjected to measurements of dielectric properties in the same manner as in Example 1. Results are shown in Table 4 together with the optimum sintering temperature (Ts).

TABLE 3

| | Main Component (wt %) | | | | | | Secondary Components (parts by weight) | | | | | |
|---|---|---|---|---|---|---|---|---|---|---|---|---|
| No. | SrTiO$_3$ | PbTiO$_3$ | CaTiO$_3$ | Bi$_2$O$_3$ | TiO$_2$ | SnO$_2$ | MnO$_2$ | Re$_2$O$_3$ | | A(Cu$_{\frac{1}{3}}$Ta$_{\frac{2}{3}}$)O$_3$ | |
| 31 | 19.5 | 37.6 | 16.9 | 16.3 | 7.9 | 1.8 | 0.15 | Re=Nd | 1.0 | A=Pb | 1.0 |
| 32 | 26.0 | 19.1 | 15.0 | 25.9 | 12.7 | 1.3 | 0.02 | Re=La | 2.0 | A=Sr | 0.1 |
| 33 | 25.7 | 18.9 | 14.8 | 25.7 | 11.2 | 3.7 | 0.50 | Re=Ce | 1.0 | A=Pb | 2.0 |
| 34 | 24.7 | 18.2 | 14.2 | 24.6 | 6.3 | 12.0 | 0.10 | Re=Nd | 2.0 | A=Pb | 5.0 |

TABLE 3-continued

| No. | Main Component (wt %) | | | | | | Secondary Components (parts by weight) | | | | |
|---|---|---|---|---|---|---|---|---|---|---|---|
| | $SrTiO_3$ | $PbTiO_3$ | $CaTiO_3$ | $Bi_2O_3$ | $TiO_2$ | $SnO_2$ | $MnO_2$ | $Re_2O_3$ | | $A(Cu_{\frac{1}{3}}Ta_{\frac{2}{3}})O_3$ | |
| 35 | 33.8 | 16.7 | 31.0 | 12.2 | 4.2 | 2.1 | 0.10 | Re=Nd | 0.5 | A=Sr | 4.0 |
| 36 | 42.8 | 14.2 | 4.2 | 25.6 | 10.1 | 3.1 | 0.10 | Re=Pr | 1.0 | A=Pb | 2.0 |
| 37 | 37.4 | 8.0 | 13.8 | 26.9 | 11.4 | 2.5 | 0.10 | Re=Sm | 1.0 | A=Sr | 2.0 |
| 38 | 25.0 | 21.1 | 33.9 | 4.4 | 7.9 | 7.7 | 0.15 | Re=Nd | 0.1 | A=Ca | 3.0 |
| 39 | 34.1 | 18.8 | 8.4 | 25.5 | 12.6 | 0.6 | 0.10 | Re=Nd | 1.0 | A=Pb | 2.0 |
| 40 | 22.5 | 18.6 | 30.5 | 18.8 | 9.1 | 0.5 | 0.10 | Re=Nd | 5.0 | A=Pb | 1.0 |
| 41 | 29.7 | 14.7 | 15.4 | 26.1 | 13.6 | 0.5 | 0.10 | Re=Ce | 2.0 | A=Ca | 1.0 |
| 42* | 17.9 | 36.1 | 6.0 | 25.3 | 9.2 | 5.5 | 0.10 | Re=Nd | 0.5 | A=Pb | 2.0 |
| 43* | 43.2 | 10.0 | 24.8 | 12.4 | 8.9 | 0.7 | 0.10 | Re=Ce | 2.0 | A=Pb | 1.0 |
| 44* | 36.7 | 6.3 | 18.7 | 25.3 | 12.3 | 0.7 | 0.10 | Re=Nd | 2.0 | A=Ca | 3.0 |
| 45* | 28.0 | 40.9 | 6.8 | 15.6 | 7.2 | 1.5 | 0.15 | Re=Nd | 1.0 | A=Sr | 2.0 |
| 46* | 39.1 | 13.0 | 3.5 | 25.6 | 12.0 | 6.8 | 0.15 | Re=Sm | 2.0 | A=Pb | 1.0 |
| 47* | 24.6 | 18.1 | 14.1 | 24.5 | 5.6 | 13.1 | 0.10 | Re=Nd | 2.0 | A=Pb | 2.0 |
| 48* | 31.5 | 10.6 | 18.9 | 25.8 | 11.0 | 2.2 | 0.10 | | 0 | A=Pb | 2.0 |
| 49* | 26.9 | 22.2 | 36.5 | 9.5 | 4.2 | 0.7 | 0.15 | Re=Nd | 2.0 | A=Pb | 3.0 |
| 50* | 25.3 | 35.6 | 18.2 | 4.2 | 10.3 | 6.4 | 0.10 | Re=Nd | 2.0 | A=Pb | 1.0 |
| 51* | 20.3 | 16.8 | 27.5 | 27.9 | 4.4 | 3.1 | 0.15 | Re=Nd | 1.0 | A=Pb | 2.0 |
| 52* | 28.2 | 12.5 | 18.6 | 26.0 | 3.2 | 11.5 | 0.10 | Re=La | 2.0 | A=Pb | 2.0 |
| 53* | 40.3 | 14.3 | 6.4 | 22.5 | 15.2 | 1.3 | 0.10 | Re=La | 2.0 | A=Pb | 3.0 |
| 54* | 37.4 | 8.0 | 13.8 | 26.9 | 11.4 | 2.5 | 0 | Re=Nd | 1.0 | A=Sr | 2.0 |
| 55* | 23.4 | 33.1 | 17.3 | 16.8 | 7.8 | 1.6 | 0.80 | Re=Nd | 1.0 | A=Pb | 2.0 |
| 56* | 25.0 | 21.1 | 33.9 | 12.6 | 5.9 | 1.5 | 0.10 | Re=Nd | 8.0 | A=Pb | 3.0 |
| 57* | 34.1 | 18.8 | 8.4 | 25.5 | 12.6 | 0.6 | 0.50 | Re=Nd | 1.0 | | 0 |
| 58* | 34.1 | 18.8 | 8.4 | 25.5 | 12.6 | 0.6 | 0.50 | Re=Nd | 1.0 | A=Pb | 8.0 |
| 59* | 31.5 | 10.6 | 18.9 | 25.8 | 13.2 | 0 | 0.10 | Re=Nd | 3.0 | A=Pb | 2.0 |
| 60 | 33.8 | 16.7 | 31.0 | 12.2 | 4.2 | 2.1 | 0.10 | Re=Nd | 0.5 | A=Sr | 4.0 |

TABLE 4

| No. | Ts (°C.) | ε (1 KHz) | tan δ | | ΔC/C₂₀ | | ρ(Ω-cm) | | ΔCv (%) |
|---|---|---|---|---|---|---|---|---|---|
| | | | 1 KHz | 1 MHz | −25° C. | +85° C. | at 25° C. | at 85° C. | |
| 31 | 1150 | 1470 | 0.20 | 0.38 | 3.1 | −5.5 | $1.1 \times 10^{14}$ | $2.9 \times 10^{13}$ | +10.1 |
| 32 | 1160 | 1050 | 0.15 | 0.27 | 2.4 | −2.2 | $1.9 \times 10^{14}$ | $3.2 \times 10^{13}$ | +12.9 |
| 33 | 1120 | 750 | 0.09 | 0.20 | 4.0 | −4.6 | $1.0 \times 10^{14}$ | $6.8 \times 10^{13}$ | +10.5 |
| 34 | 1100 | 500 | 0.10 | 0.15 | 4.1 | −6.2 | $9.7 \times 10^{14}$ | $7.2 \times 10^{13}$ | +6.5 |
| 35 | 1120 | 1330 | 0.10 | 0.13 | 4.5 | −6.6 | $1.2 \times 10^{14}$ | $1.0 \times 10^{13}$ | +7.0 |
| 36 | 1130 | 1010 | 0.12 | 0.25 | 6.2 | −7.2 | $9.3 \times 10^{14}$ | $5.7 \times 10^{13}$ | +1.3 |
| 37 | 1150 | 510 | 0.05 | 0.07 | 6.1 | −7.0 | $1.2 \times 10^{14}$ | $1.0 \times 10^{13}$ | +3.9 |
| 38 | 1130 | 530 | 0.04 | 0.08 | 5.4 | −7.2 | $1.2 \times 10^{14}$ | $1.1 \times 10^{13}$ | +2.0 |
| 39 | 1110 | 1060 | 0.23 | 0.45 | 3.3 | −6.0 | $9.5 \times 10^{14}$ | $1.3 \times 10^{13}$ | +4.4 |
| 40 | 1140 | 530 | 0.07 | 0.09 | 6.4 | −7.2 | $1.3 \times 10^{14}$ | $1.1 \times 10^{13}$ | +3.7 |
| 41 | 1140 | 620 | 0.16 | 0.29 | 1.7 | −2.3 | $1.3 \times 10^{14}$ | $1.1 \times 10^{13}$ | +4.0 |
| 42* | 1130 | 1240 | 0.35 | 1.70 | 4.8 | −6.7 | $9.7 \times 10^{14}$ | $3.2 \times 10^{13}$ | +1.0 |
| 43* | 1150 | 610 | 0.08 | 0.10 | 10.7 | −12.8 | $1.3 \times 10^{14}$ | $1.1 \times 10^{13}$ | +8.9 |
| 44* | 1070 | 390 | 0.10 | 0.19 | 3.0 | −4.0 | $1.2 \times 10^{14}$ | $3.3 \times 10^{13}$ | +4.2 |
| 45* | 1130 | 2020 | 0.23 | 2.10 | 12.9 | −17.0 | $1.1 \times 10^{14}$ | $1.0 \times 10^{13}$ | −4.8 |

| No. | Ts (°C.) | ε (1 KHz) | tan δ | | ΔC/C (%) | | ρ(Ω-cm) | | ΔCv (%) |
|---|---|---|---|---|---|---|---|---|---|
| | | | 1 KHz | 1 MHz | −25° C. | +85° C. | at 25° C. | at 85° C. | |
| 46* | 1130 | 1200 | 0.18 | 1.00 | 5.2 | −6.9 | $1.2 \times 10^{14}$ | $2.2 \times 10^{13}$ | −8.8 |
| 47* | 1180 | 380 | 0.27 | 1.00 | 6.8 | −8.5 | $8.9 \times 10^{13}$ | $7.5 \times 10^{13}$ | +1.0 |
| 48* | 1160 | 900 | 0.22 | 1.20 | 1.1 | −2.2 | $1.2 \times 10^{14}$ | $3.5 \times 10^{13}$ | +4.1 |
| 49* | 1120 | 400 | 0.12 | 0.08 | 6.0 | −6.9 | $1.1 \times 10^{14}$ | $2.1 \times 10^{13}$ | +5.2 |
| 50* | 1120 | 1320 | 0.14 | 0.28 | 8.5 | −12.8 | $1.3 \times 10^{14}$ | $2.5 \times 10^{13}$ | +2.1 |
| 51* | 1150 | 510 | 0.31 | 0.97 | 6.3 | −7.2 | $1.2 \times 10^{14}$ | $2.9 \times 10^{13}$ | +2.7 |
| 52* | 1230 | 870 | 0.17 | 0.38 | 1.9 | −5.1 | $1.3 \times 10^{14}$ | $2.3 \times 10^{13}$ | +2.1 |
| 53* | 1120 | 950 | 0.15 | 0.29 | 5.2 | −10.9 | $1.1 \times 10^{14}$ | $1.2 \times 10^{13}$ | +1.0 |
| 54* | 1250 | 620 | 0.14 | 0.18 | 3.8 | −4.1 | $9.8 \times 10^{13}$ | $9.9 \times 10^{11}$ | +2.2 |
| 55* | 1100 | 1120 | 0.68 | 0.89 | 3.2 | −6.2 | $1.4 \times 10^{14}$ | $1.1 \times 10^{13}$ | +7.3 |
| 56* | 1110 | 450 | 0.03 | 0.07 | 5.2 | −7.0 | $1.2 \times 10^{14}$ | $1.7 \times 10^{13}$ | +3.8 |
| 57* | 1200 | 1190 | 0.75 | 1.90 | 5.0 | −9.5 | $9.5 \times 10^{13}$ | $2.5 \times 10^{13}$ | +4.0 |
| 58* | 1090 | 900 | 0.13 | 0.37 | 2.3 | −2.8 | $8.6 \times 10^{13}$ | $5.3 \times 10^{12}$ | +3.3 |
| 59* | 1180 | 960 | 0.16 | 0.38 | 1.8 | −2.3 | $9.2 \times 10^{13}$ | $7.1 \times 10^{11}$ | +1.0 |
| 60 | 1100 | 1320 | 0.10 | 0.12 | 4.7 | −6.8 | $1.3 \times 10^{14}$ | $1.1 \times 10^{13}$ | +7.0 |

From the data shown in Table 4, it can be seen that the present invention makes it possible to produce a dielectric ceramic composition having a high dielectric constant of not less than 500, a low dielectric loss (tan δ) of not more than 0.5% at 1 MHz, and high specific resistance of not less than $10^{13}$ Ω-cm at room temperature and high temperature. In addition, the dielectric constant is scarcely decreased even if a direct current voltage of 5 KV/mm is applied to the products. Further, the temperature change rate of capacitance is considerably small and −7.2% at the maximum of +85° C. The composition of the present invention has a sintering temperature ranging from 1070° to 1180° which is lower by about 100° to 200° C. as compared with the compositions of the prior art.

EXAMPLE 3

As raw materials, there were used powders of industrial grade $SrCO_3$, $Pb_3O_4$, $CaCO_3$, $Bi_2O_3$, $TiO_2$, $SnO_2$, $MnO_2$, CuO, $Nb_2O_5$, $Nd_2O_3$, $La_2O_3$, $CeO_2$, $Pr_2O_3$ and $Sm_2O_3$. Using the raw materials for the main component, there were prepared calcined powders of $SrTiO_3$, $PbTiO_3$, $CaTiO_3$, $Pb(Cu_{\frac{1}{3}}Nb_{\frac{2}{3}})O_3$, $Sr(Cu_{\frac{1}{3}}Nb_{\frac{2}{3}})O_3$ and $Ca(Cu_{\frac{1}{3}}Nb_{\frac{2}{3}})O_3$ in the same manner as in Example 1. $SrTiO_3$ and $CaTiO_3$ were calcined at 1150° C., $PbTiO_3$ being at 950° C., and $Pb(Cu_{\frac{1}{3}}Nb_{\frac{2}{3}})O_3$, $Sr(Cu_{\frac{1}{3}}Nb_{\frac{2}{3}})O_3$, $Ca(Cu_{\frac{1}{3}}Nb_{\frac{2}{3}})O_3$ being at 850° C., respectively.

The thus prepared calcined powders were weighed together with powders of $MnO_2$ and oxides of rare earth elements ($Nd_2O_3$, $La_2O_3$, $CeO_2$, $Pr_2O_3$ and $Sm_2O_3$) to prepare a mixture of a dielectric ceramic composition having compositional proportions shown in Table 5, and then ball milled in a polyethylene pot with alumina balls by the wet process for 16 hours together with a suitable amount of binder. The mixture was dried, granulated and then compacted into disks with a diameter of 10 mm and a thickness of 1.2 mm under a pressure of 2000 Kg/cm². The disks were fired at a temperature ranging from 1070° to 1250° C. to prepare ceramic disks.

A pair of silver electrodes were provided on opposite surfaces of the resultant ceramic disk by applying silver paste on its opposite sides and then then baking it at 800° C.

Test specimen No. 90 was prepared in the following manner: Raw materials of industrial grade $SrCO_3$, $Pb_3O_4$, $CaCO_3$, $Bi_2O_3$, $TiO_2$, $SnO_2$, $MnO_2$, CuO, $Nb_2O_5$ and $Nd_2O_3$ were weighed and milled by the wet process with a ball mill to prepare a mixture, of which a product has a composition shown in Table 5. The mixture was calcined at 950° C. for 2 hours, crushed and then ball milled by the wet process together with 3 parts by weight of polyvinyl alcohol binder. The resultant mixture was dried, granulated and then compacted into disks with a diameter of 10 mm and a thickness of 1.2 mm under a pressure of 2000 Kg/cm². The disks were fired at a temperature ranging from 1100° to 1230° C. to prepare ceramic disks. A pair of silver electrodes were provided on each resultant ceramic disk by applying silver paste on its opposite sides and then then baking it at 800° C.

The thus prepared test specimens were subjected to measurements of dielectric properties in the same manner as in Example 1. Results are shown in Table 6 together with the optimum sintering temperature (Ts).

TABLE 5

| No. | Main Component (wt %) | | | | | | Secondary Components (parts by weight) | | |
|---|---|---|---|---|---|---|---|---|---|
| | $SrTiO_3$ | $PbTiO_3$ | $CaTiO_3$ | $Bi_2O_3$ | $TiO_2$ | $SnO_2$ | $MnO_2$ | $Re_2O_3$ | $A(Cu_{\frac{1}{3}}Nb_{\frac{2}{3}})O_3$ |
| 61 | 19.5 | 37.6 | 16.9 | 16.3 | 7.9 | 1.8 | 0.15 | Re=Nd 1.0 | A=Ca 2.0 |
| 62 | 26.0 | 19.1 | 15.0 | 25.9 | 12.7 | 1.3 | 0.02 | Re=La 2.0 | A=Pb 0.1 |
| 63 | 25.7 | 18.9 | 14.8 | 25.7 | 11.2 | 3.7 | 0.50 | Re=Ce 1.0 | A=Sr 2.0 |
| 64 | 24.7 | 18.2 | 14.2 | 24.6 | 6.3 | 12.0 | 0.10 | Re=Nd 2.0 | A=Pb 2.0 |
| 65 | 33.8 | 16.7 | 31.0 | 12.2 | 4.2 | 2.1 | 0.10 | Re=Nd 0.5 | A=Sr 3.0 |
| 66 | 42.8 | 14.2 | 4.2 | 25.6 | 10.1 | 3.1 | 0.10 | Re=Pr 1.0 | A=Pb 5.0 |
| 67 | 37.4 | 8.0 | 13.8 | 26.9 | 11.4 | 2.5 | 0.10 | Re=Sm 1.0 | A=Pb 1.0 |
| 68 | 25.0 | 21.1 | 33.9 | 4.4 | 7.9 | 7.7 | 0.15 | Re=Nd 0.1 | A=Ca 2.0 |
| 69 | 34.1 | 18.8 | 8.4 | 25.5 | 12.6 | 0.6 | 0.10 | Re=Nd 1.0 | A=Pb 3.0 |
| 70 | 22.5 | 18.6 | 30.5 | 18.8 | 9.1 | 0.5 | 0.10 | Re=Nd 5.0 | A=Pb 2.0 |
| 71 | 29.7 | 14.7 | 15.4 | 26.1 | 13.6 | 0.5 | 0.10 | Re=Ce 2.0 | A=Pb 4.0 |
| 72* | 17.9 | 36.1 | 6.0 | 25.3 | 9.2 | 5.5 | 0.10 | Re=Nd 0.5 | A=Pb 2.0 |
| 73* | 43.2 | 10.0 | 24.8 | 12.4 | 8.9 | 0.7 | 0.10 | Re=Ce 2.0 | A=Pb 3.0 |
| 74* | 36.7 | 6.3 | 18.7 | 25.3 | 12.3 | 0.7 | 0.10 | Re=Nd 2.0 | A=Ca 2.0 |
| 75* | 28.0 | 40.9 | 6.8 | 15.6 | 7.2 | 1.5 | 0.15 | Re=Nd 1.0 | A=Sr 1.0 |
| 76* | 39.1 | 13.0 | 3.5 | 25.6 | 12.0 | 6.8 | 0.15 | Re=Sm 2.0 | A=Pb 3.0 |
| 77* | 24.6 | 18.1 | 14.1 | 24.5 | 5.6 | 13.1 | 0.10 | Re=Nd 2.0 | A=Pb 3.0 |
| 78* | 31.5 | 10.6 | 18.9 | 25.8 | 11.0 | 2.2 | 0.10 | 0 | A=Pb 2.0 |
| 79* | 26.9 | 22.2 | 36.5 | 9.5 | 4.2 | 0.7 | 0.15 | Re=Nd 2.0 | A=Pb 2.0 |
| 80* | 25.3 | 35.6 | 18.2 | 4.2 | 10.3 | 6.4 | 0.10 | Re=Nd 2.0 | A=Pb 2.0 |
| 81* | 20.3 | 16.8 | 27.5 | 27.9 | 4.4 | 3.1 | 0.15 | Re=Nd 1.0 | A=Pb 1.0 |
| 82* | 28.2 | 12.5 | 18.6 | 26.0 | 3.2 | 11.5 | 0.10 | Re=La 2.0 | A=Pb 2.0 |
| 83* | 40.3 | 14.3 | 6.4 | 22.5 | 15.2 | 1.3 | 0.10 | Re=La 2.0 | A=Pb 0.5 |
| 84* | 37.4 | 8.0 | 13.8 | 26.9 | 11.4 | 2.5 | 0 | Re=Nd 1.0 | A=Pb 2.0 |
| 85* | 23.4 | 33.1 | 17.3 | 16.8 | 7.8 | 1.6 | 0.80 | Re=Nd 1.0 | A=Sr 2.0 |
| 86* | 25.0 | 21.1 | 33.9 | 12.6 | 5.9 | 1.5 | 0.10 | Re=Nd 8.0 | A=Sr 3.0 |
| 87* | 34.1 | 18.8 | 8.4 | 25.5 | 12.6 | 0.6 | 0.50 | Re=Nd 1.0 | 0 |
| 88* | 34.1 | 18.8 | 8.4 | 25.5 | 12.6 | 0.6 | 0.50 | Re=Nd 1.0 | A=Pb 8.0 |
| 89* | 31.5 | 10.6 | 18.9 | 25.8 | 13.2 | 0 | 0.10 | Re=Nd 3.0 | A=Pb 2.0 |
| 90 | 33.8 | 16.7 | 31.0 | 12.2 | 4.2 | 2.1 | 0.10 | Re=Nd 0.5 | A=Pb 3.0 |

TABLE 6

| No. | Ts (°C.) | ε (1 KHz) | tan δ (%) | | ΔC/C₂₀ (%) | | ρ(Ω-cm) | | ΔC$_v$ (%) |
|---|---|---|---|---|---|---|---|---|---|
| | | | 1 KHz | 1 MHz | −25° C. | +85° C. | at 25° C. | at 85° C. | |
| 61 | 1130 | 1490 | 0.21 | 0.39 | 3.0 | −5.9 | $1.2 \times 10^{14}$ | $3.1 \times 10^{13}$ | +10.0 |
| 62 | 1180 | 1040 | 0.14 | 0.25 | 2.5 | −2.0 | $2.1 \times 10^{14}$ | $3.2 \times 10^{13}$ | +13.0 |
| 63 | 1120 | 750 | 0.10 | 0.23 | 4.1 | −4.5 | $1.0 \times 10^{14}$ | $7.0 \times 10^{13}$ | +10.2 |
| 64 | 1150 | 510 | 0.10 | 0.18 | 4.2 | −6.0 | $9.8 \times 10^{13}$ | $7.3 \times 10^{13}$ | +6.9 |
| 65 | 1110 | 1390 | 0.12 | 0.15 | 4.5 | −6.7 | $1.3 \times 10^{14}$ | $1.1 \times 10^{13}$ | +7.2 |
| 66 | 1070 | 1010 | 0.13 | 0.26 | 6.0 | −7.1 | $9.2 \times 10^{13}$ | $6.0 \times 10^{13}$ | +1.5 |
| 67 | 1150 | 520 | 0.05 | 0.06 | 6.3 | −7.2 | $1.1 \times 10^{14}$ | $1.0 \times 10^{13}$ | +3.8 |
| 68 | 1130 | 550 | 0.06 | 0.09 | 5.1 | −7.1 | $1.4 \times 10^{14}$ | $1.5 \times 10^{13}$ | +2.0 |
| 69 | 1100 | 1030 | 0.22 | 0.48 | 3.1 | −4.9 | $9.6 \times 10^{13}$ | $1.2 \times 10^{13}$ | +4.2 |
| 70 | 1110 | 560 | 0.08 | 0.10 | 4.0 | −6.2 | $1.2 \times 10^{14}$ | $1.4 \times 10^{13}$ | +3.9 |
| 71 | 1100 | 610 | 0.16 | 0.25 | 1.7 | −2.3 | $1.3 \times 10^{14}$ | $1.0 \times 10^{13}$ | +4.2 |
| 72* | 1130 | 1230 | 0.35 | 1.50 | 4.8 | −6.5 | $9.8 \times 10^{13}$ | $3.3 \times 10^{13}$ | +1.0 |
| 73* | 1150 | 600 | 0.07 | 0.09 | 10.9 | −12.5 | $1.5 \times 10^{14}$ | $1.1 \times 10^{13}$ | +9.0 |

TABLE 6-continued

| No. | Ts (°C.) | ε (1 KHz) | tan δ (%) 1 KHz | tan δ (%) 1 MHz | ΔC/C$_{20}$ (%) −25° C. | ΔC/C$_{20}$ (%) +85° C. | ρ(Ω-cm) at 25° C. | ρ(Ω-cm) at 85° C. | ΔC$_v$ (%) |
|---|---|---|---|---|---|---|---|---|---|
| 74* | 1100 | 390 | 0.12 | 0.20 | 3.3 | −4.0 | $1.1 \times 10^{14}$ | $3.5 \times 10^{13}$ | +4.3 |
| 75* | 1150 | 2010 | 0.21 | 2.00 | 12.9 | −16.9 | $1.0 \times 10^{14}$ | $1.2 \times 10^{13}$ | −4.3 |
| 76* | 1120 | 1210 | 0.19 | 1.10 | 5.1 | −7.0 | $1.3 \times 10^{14}$ | $2.3 \times 10^{13}$ | −9.0 |
| 77* | 1180 | 370 | 0.28 | 0.95 | 7.0 | −8.9 | $9.0 \times 10^{13}$ | $8.0 \times 10^{13}$ | +0.5 |
| 78* | 1160 | 910 | 0.23 | 1.00 | 5.3 | −6.8 | $1.2 \times 10^{14}$ | $1.1 \times 10^{13}$ | +3.9 |
| 79* | 1120 | 430 | 0.13 | 0.09 | 6.0 | −7.0 | $1.2 \times 10^{14}$ | $3.2 \times 10^{13}$ | +4.8 |
| 80* | 1120 | 1320 | 0.13 | 0.22 | 7.7 | −12.3 | $1.4 \times 10^{14}$ | $2.7 \times 10^{13}$ | +2.2 |
| 81* | 1160 | 520 | 0.32 | 1.00 | 6.4 | −7.1 | $1.2 \times 10^{14}$ | $3.0 \times 10^{13}$ | +2.8 |
| 82* | 1230 | 870 | 0.18 | 0.40 | 2.0 | −5.1 | $1.5 \times 10^{14}$ | $2.3 \times 10^{13}$ | +2.0 |
| 83* | 1140 | 1000 | 0.15 | 0.36 | 4.6 | −11.1 | $1.2 \times 10^{14}$ | $1.4 \times 10^{13}$ | +1.1 |
| 84* | 1250 | 610 | 0.13 | 0.17 | 3.8 | −4.2 | $9.6 \times 10^{13}$ | $9.7 \times 10^{11}$ | +2.0 |
| 85* | 1130 | 1130 | 0.70 | 0.91 | 3.3 | −6.3 | $1.4 \times 10^{14}$ | $1.2 \times 10^{13}$ | +7.6 |
| 86* | 1110 | 460 | 0.03 | 0.07 | 5.3 | −7.0 | $1.2 \times 10^{14}$ | $1.8 \times 10^{13}$ | +3.9 |
| 87* | 1200 | 1190 | 0.75 | 1.90 | 5.0 | −9.5 | $9.5 \times 10^{13}$ | $2.5 \times 10^{13}$ | +4.0 |
| 88* | 1090 | 910 | 0.15 | 0.38 | 2.4 | −2.8 | $8.7 \times 10^{13}$ | $6.0 \times 10^{12}$ | +3.4 |
| 89* | 1170 | 960 | 0.15 | 0.37 | 2.0 | −2.2 | $9.2 \times 10^{13}$ | $7.0 \times 10^{11}$ | +1.1 |
| 90  | 1100 | 1380 | 0.10 | 0.13 | 4.6 | −6.7 | $1.3 \times 10^{14}$ | $1.2 \times 10^{13}$ | +7.3 |

As can be seen from the data in Table 6, the dielectric ceramic composition of the present invention has a high dielectric constant of not less than 500, a low dielectric loss (tan δ) of not more than 0.5% even at 1 MHz, and a high specific resistance of not less than $10^{13}$ Ω-cm at room temperature and high temperature. Further, the dielectric constant is scarcely reduced even if a direct current voltage of 5 KV/mm is applied to the products. Further, the composition of the present invention has a considerably small temperature change rate of capacitance which is −7.2% at the maximum at +85° C., and a low sintering temperature ranging from 1070° to 1180° C. which is lower by about 100° to 200° C. that that of the prior art.

What is claimed is:

1. A dielectric ceramic composition consisting essentially of a main component of a SrTiO$_3$—PbTiO$_3$—Bi$_2$O$_3$—TiO$_2$—CaTiO$_3$ system and secondary components of manganese oxides, at least one oxide of rare earth elements selected from the group consisting of Nd, La, Ce, Pr and Sm, and one of complex perovskite compounds expressed by the general formula:

$$A(Cu_{\frac{1}{2}}W_{\frac{1}{2}})O_3$$

(where A is at least one element selected from the group consisting of Pb, Sr and Ca), $$A(Cu_{\frac{1}{3}}Ta_{\frac{2}{3}})O_3$$

(where A is at least one element selected from the group consisting of Pb, Sr and Ca), and $$A(Cu_{\frac{1}{3}}Nb_{\frac{2}{3}})O_3$$

(where A is at least one element selected from the group consisting of Pb, Sr and Ca), said main component consisting essentially, by weight, of 19.5 to 42.8% of SrTiO$_3$, 8.0 to 37.6% of PbTiO$_3$, 4.2 to 33.9% of CaTiO$_3$, 4.4 to 26.9% of Bi$_2$O$_3$, 4.2 to 13.6% of TiO$_2$ and 0.5 to 12% of SnO$_2$, the contents of said secondary components per 100 parts by weight of said main component being 0.02 to 0.50 parts by weight for manganese oxide in terms of MnO$_2$, 0.1 to 5.0 parts by weight for oxides of rare earth elements in terms of Re$_2$O$_3$, and 0.1 to 5.0 parts by weight for said at least one complex perovskite compound.

2. The dielectric ceramic composition according to claim 1 wherein said secondary components consist essentially of manganese oxides, at least one oxide of rare earth elements selected from the group consisting of Nd, La, Ce, Pr and Sm, and a complex perovskite compound expressed by the general formula:

$$A(Cu_{\frac{1}{2}}W_{\frac{1}{2}})O_3$$

(where A is at least one element selected from the group consisting of Pb, Sr and Ca), the content of the secondary components per 100 parts by weight of said main component being 0.01 to 0.50 parts by weight for manganese oxide in terms of MnO$_2$, 0.1 to 5.0 parts by weight for oxides of rare earth elements in terms of Re$_2$O$_3$, and 0.1 to 5.0 parts by weight for said complex perovskite compound.

3. The dielectric ceramic composition according to claim 1 wherein said secondary components consists essentially of manganese oxides, at least one oxide of rare earth elements selected from the group consisting of Nd, La, Ce, Pr and Sm, and a complex perovskite compound expressed by the general formula:

$$A(Cu_{\frac{1}{3}}Ta_{\frac{2}{3}})O_3$$

(where A is at least one element selected from the group consisting of Pb, Sr and Ca), the content of the secondary components per 100 parts by weight of said main component being 0.02 to 0.50 parts by weight of manganese oxide in terms of MnO$_2$, 0.1 to 5.0 parts by weight for oxides of rare earth elements in terms of Re$_2$O$_3$, and 0.1 to 5.0 parts by weight for said complex perovskite compound.

4. The dielectric ceramic composition according to claim 1 wherein said secondary components consists essentially of manganese oxides, at least one oxide of rare earth elements selected from the group consisting of Nd, La, Ce, Pr and Sm, and a complex perovskite compound expressed by the general formula:

$$A(Cu_{\frac{1}{3}}Nb_{\frac{2}{3}})O_3$$

(where A is at least one element selected from the group consisting of Pb, Sr and Ca), the content of the secondary components per 100 parts by weight of said main component being 0.02 to 0.50 parts by weight for manganese oxide in terms of MnO$_2$, 0.1 to 5.0 parts by weight for oxides of rare earth elements in terms of Re$_2$O$_3$, and 0.1 to 5.0 parts by weight for said complex perovskite compound.

* * * * *